(12) United States Patent
Jarvenpaa et al.

(10) Patent No.: US 12,346,992 B2
(45) Date of Patent: Jul. 1, 2025

(54) RENDERING GLARE CONTENT

(71) Applicant: Nokia Technologies Oy, Espoo (FI)

(72) Inventors: Toni Jarvenpaa, Akaa (FI); Jyrki Kimmel, Tampere (FI); Kiti Muller, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/768,670

(22) PCT Filed: Oct. 9, 2020

(86) PCT No.: PCT/IB2020/059519
§ 371 (c)(1),
(2) Date: Apr. 13, 2022

(87) PCT Pub. No.: WO2021/074759
PCT Pub. Date: Apr. 22, 2021

(65) Prior Publication Data
US 2024/0112374 A1    Apr. 4, 2024

(30) Foreign Application Priority Data
Oct. 15, 2019   (EP) .................................... 19203233

(51) Int. Cl.
*G06T 11/00* (2006.01)
*G06F 3/01* (2006.01)
*G06F 3/14* (2006.01)

(52) U.S. Cl.
CPC .............. *G06T 11/00* (2013.01); *G06F 3/011* (2013.01); *G06F 3/1407* (2013.01)

(58) Field of Classification Search
CPC ......... G06T 11/00; G06F 3/011; G06F 3/1407
USPC .................................................. 345/419, 589
See application file for complete search history.

(56) References Cited

U.S. PATENT DOCUMENTS

| | | | |
|---|---|---|---|
| 4,800,404 A | 1/1989 | Ginsburg et al. | 351/243 |
| 11,256,005 B1 * | 2/2022 | Muller | G02B 3/0037 |
| 2003/0169213 A1 | 9/2003 | Spero | 345/7 |
| 2010/0246892 A1 | 9/2010 | Hirasawa et al. | 382/106 |
| 2016/0220162 A1 | 8/2016 | Mantysalo et al. | 5/16 |
| 2017/0269370 A1 | 9/2017 | Sato et al. | |
| 2019/0212482 A1 | 7/2019 | Richards | |

FOREIGN PATENT DOCUMENTS

| | | |
|---|---|---|
| CN | 200948128 Y | 9/2007 |
| CN | 101773379 A | 7/2010 |
| EP | 2 837 299 A1 | 2/2015 |
| JP | H-08140933 A | 6/1996 |

* cited by examiner

*Primary Examiner* — Jacinta M Crawford
(74) *Attorney, Agent, or Firm* — McCarter & English LLP

(57) ABSTRACT

An apparatus including: a display configured to render display content over a field of view; and a glare system configured to render glare content in the field of view, wherein the glare system is configured to render the glare content at different positions across the field of view at different times while the display renders the display content.

20 Claims, 7 Drawing Sheets

RENDERING GLARE CONTENT

CROSS REFERENCE TO RELATED APPLICATION

This patent application is a U.S. National Stage application of International Patent Application Number PCT/IB2020/059519 filed Oct. 9, 2020, which is hereby incorporated by reference in its entirety, and claims priority to EP 19203233.2 filed Oct. 15, 2019.

TECHNOLOGICAL FIELD

Embodiments of the present disclosure relate to rendering glare content.

BACKGROUND

It is desirable to develop technology that makes displayed content more immersive. Displayed content may be static or dynamic. Static content may comprise a still image. Dynamic content may comprise filmed video content, augmented reality (AR) content, or virtual reality (VR) content.

Some bright light sources that can be viewed in real life may blind a user, due to glare. Glare inhibits the human capability to gather visual information from an environment. For example, human dark vision can be inhibited by bright headlamps at night. Glare can also distract a user from performing a task. For example, glare from direct sunlight may distract a driver or a pilot. Different people have different sensitivities to glare, differently affecting their ability to perform a task.

BRIEF SUMMARY

According to various, but not necessarily all, embodiments there is provided an apparatus comprising: a display configured to render display content over a field of view; and a glare system configured to render glare content in the field of view, wherein the glare system is configured to render the glare content at different positions across the field of view at different times while the display renders the display content In some, but not necessarily all examples the display is configured to render the display content at up to a first peak luminance, and the glare system is configured to render the glare content at up to a second peak luminance greater than the first peak luminance.

In some, but not necessarily all examples the glare system comprises a glare emitter, and optics configured to superimpose the glare content from the glare emitter onto the field of view. In some, but not necessarily all examples the optics comprises a beam combiner configured to combine the display content of the display and the glare content of the glare emitter.

In some, but not necessarily all examples the glare system comprises a plurality of glare emitters.

In some, but not necessarily all examples the glare system is configured to render the glare content at different positions across the field of view concurrently, while the display renders the display content.

In some, but not necessarily all examples the apparatus comprises a controller configured to control the position of the glare content rendered by the glare system. In some, but not necessarily all examples the controller is configured to control the position of the glare content in dependence on control of the display content rendered by the display. In some, but not necessarily all examples the controller is configured to control the position of the glare content based on a predetermined or random pattern. In some, but not necessarily all examples the controller is configured to dynamically move the position of the glare content across the field of view while the display renders the display content.

In some, but not necessarily all examples the apparatus comprises an eye sensor configured to detect at least one ocular characteristic while the display content and the glare content are rendered. In some, but not necessarily all examples the apparatus is configured to cause information from the eye sensor to be stored in non-volatile memory.

In some, but not necessarily all examples the display is a near-eye display.

According to various, but not necessarily all, embodiments of the invention there is provided a head-mounted display system comprising the near-eye display and the glare system for one or each eye of a user.

According to various, but not necessarily all, embodiments of the invention there is provided a method comprising: causing a display to render display content over a field of view; causing a glare system to render glare content in the field of view; and controlling the glare system to render the glare content at different positions across the field of view at different times while the display renders the display content.

According to various, but not necessarily all, embodiments of the invention there is provided examples as claimed in the appended claims.

BRIEF DESCRIPTION

Some examples will now be described with reference to the accompanying drawings in which.

DETAILED DESCRIPTION

Figure 1:
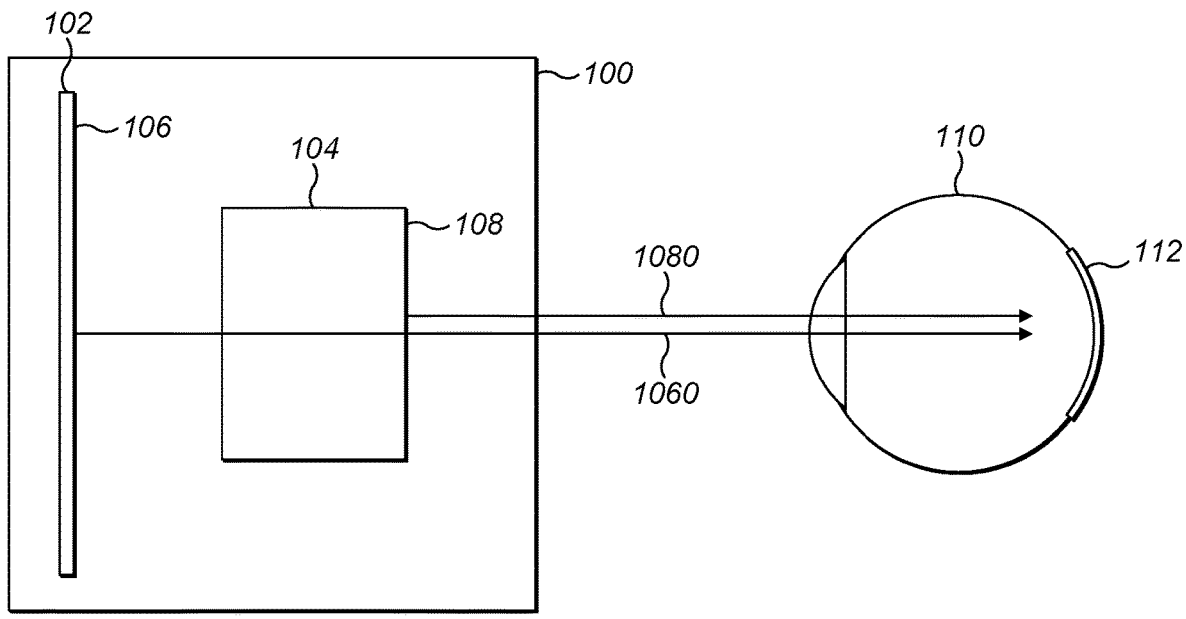
FIG. 1 shows an example of the subject matter described herein.
Figure 5A:
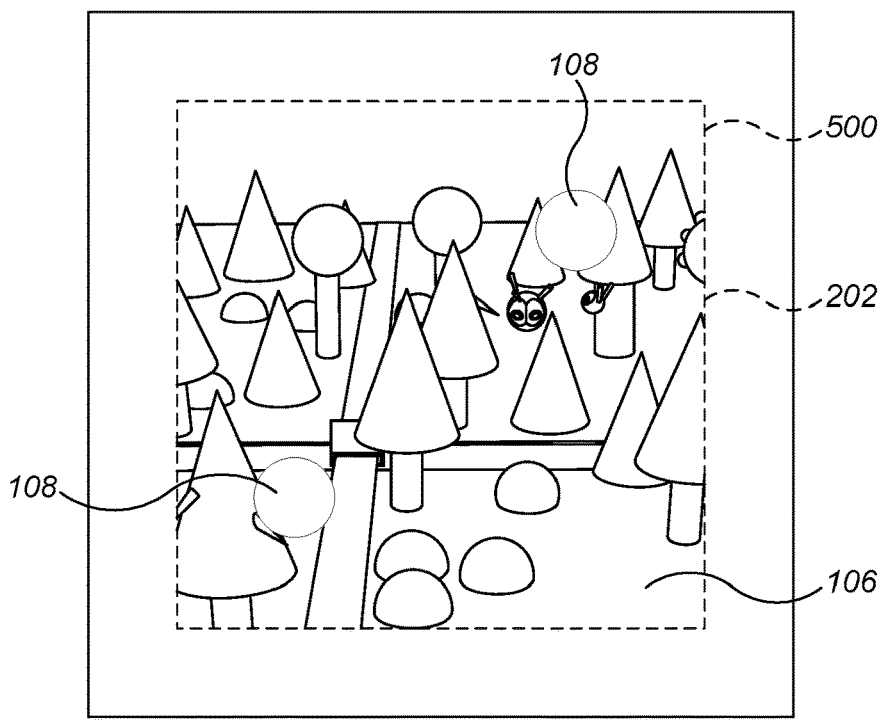
FIGS. 5A, 5B show examples of the subject matter described herein.
Figure 5B:
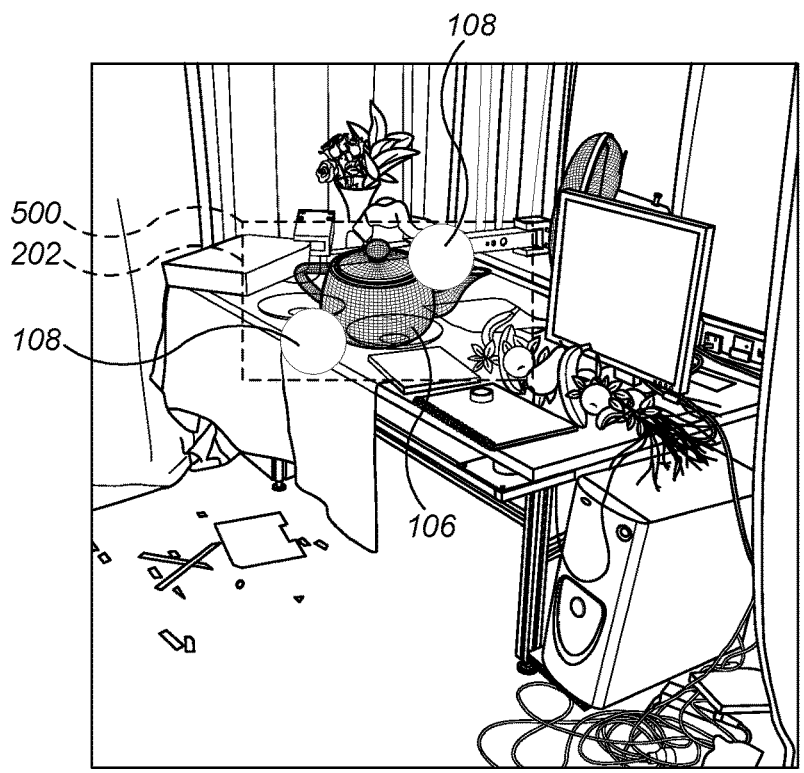

FIG. 1 illustrates an apparatus 100 comprising: a display 102 configured to render display content 106; and a glare system 104 configured to render glare content 108. The apparatus 100 is configured to combine the display content 106 and the glare content 108 to form a combined rendered image 500 with one or more regions of elevated brightness. Examples of combined images 500 are shown in FIGS. 5A, 5B. FIG. 1 illustrates a retinal image 112 in a user's eye 110, representing the combined image 500 as seen by the user.

Rendering in this context means providing in a form that is perceived by the user. The display content 106 means display output of the display 102 and the glare content 108 means glare output of the glare system 104. The display content 106 may be static or dynamic.

The display 102 as referred to herein is a display source which acts as a source of first pixelated light 1060 providing the display content 106. The display source may be a display panel as illustrated, such as a backlit liquid crystal display or a light emitting diode display. Alternatively, the display 102 may be configured as a projector configured to project the display content 106 onto a reflective screen of the apparatus 100 or directly onto a user's retina.

The display 102 is configured to render the display content 106 at up to a first peak luminance. The first peak luminance of the display 102 is limited by design constraints such as a required high spatial resolution of pixels or a required high dynamic range while displaying dark scenes. The first peak luminance takes into account any illuminator, such as a backlight, which the display 102 may have.

The glare system 104 acts as a source of second light 1080 providing glare content 108. The glare system 104 is configured to render glare content 108 at up to a second peak luminance that is brighter than the first peak luminance. Depending on implementation, the second peak luminance of the glare system 104 may be at least double the first peak luminance of the display 102. The second peak luminance of the glare system 104 may have a value in the order of magnitude of thousands of candela per square metre (cd/sqm) or more, not in the order of magnitude of hundreds or less. For example, a second peak luminance of approximately 5000 cd/sqm±1000 cd/sqm can produce a strong glare effect if required by the implementation. In some, but not necessarily all of the above examples, the first peak luminance of the display 102 could have a value in the order of magnitude of hundreds of cd/sqm, which enables the glare to stand out even if the display 102 is operated at peak luminance.

The relative positioning of the glare system 104 and the display 102 within the apparatus 100 are not limited to the arrangement shown in FIG. 1. Further, the features of the apparatus 100 may be provided by a single device or module as shown, or by a plurality of devices or modules that form a system when combined.

Figure 2:
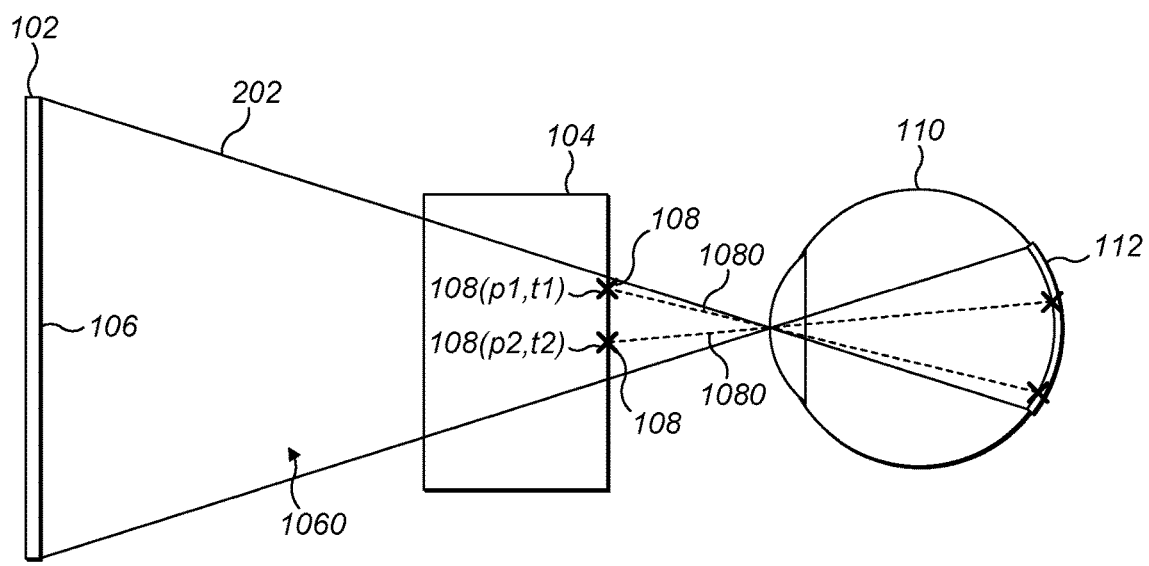
FIG. 2 shows another example of the subject matter described herein.

FIG. 2 illustrates how the glare content 108 can be positioned with respect to the display content 106.

As illustrated in FIG. 2, the display content 106 is rendered by the display 102 over a field of view 202. The field of view 202 is the amount of field of view of user vision occupied by the display content 106, as modified by any optics, such as magnifiers, that the apparatus 100 may have.

The field of view 202 of the display content 106 may cover the whole (full-screen) or at least a portion of an available display field of view (DFOV) of the display 102. A DFOV is the amount of field of view of user vision occupied by the physical display 102. A larger diagonal screen size of the display 102 occupies a greater DFOV.

As illustrated in FIG. 2, the glare system 104 is configured to render the glare content 108 in the field of view 202 of the display content 106. The glare content 108 comprises at least one region (area) of glare content 108 extending across a portion of the field of view 202 of the display content 106. In some implementations, a region of glare content 108 is capable of being small enough relative to the display content 106 to have a distinguishable shape within the combined image 500, such as a spot or line. A region of glare content 108 may be controllable by the glare system 104 to have diffuse edges. In some examples, a region of glare content 108 may be controllable to have sharp, defined edges. Other regions of the display content 106 in the combined image 500 may be non-brightened by the glare content 108.

As illustrated in FIG. 2, the glare system 104 is configured to render the glare content 108 at different positions inside the field of view 202 of the display content 106. The glare system 104 may be configured to vary the position of the glare content 108 within the boundaries of the DFOV.

Rendering glare content 108 inside a field of view 202 would be understood to include keeping rendered glare content 108 fully within the boundaries of the field of view 202, and depending on implementation could include allowing an area/line of glare content 108 predominantly inside the field of view 202 to overlap at least one boundary of the field of view 202.

Rendering glare content 108 at different positions would be understood to include the capability to render first glare content 108 at a first position in the field of view 202 at a first time, and to render second glare content 108 at a second different position in the field of view 202 at the first time and/or at a later time, wherein the second position is offset from the first position in a first dimension (e.g. horizontal) and/or in a second orthogonal dimension (e.g. vertical) in the same plane as the first dimension. As a result, the combined image 500 can have spatially variable or spatiotemporally variable glare/peak luminance.

In some, but not necessarily all examples the glare system 104 is configured to dynamically move a region of glare content 108 from a first position p1 within (inside) the field of view 202 at time t1, to a second position p2 within the field of view 202 at time t2. The second position p2 is offset from the first position p1 in the first dimension and/or in the second dimension. Dynamic movement means that the region of glare content 108 is moved while continuing to be rendered by the glare system 104. The glare system 104 may have sufficient refresh rate/frame rate and spatial resolution to provide a smooth motion.

In some, but not necessarily all examples the glare system 104 may be configured to render a first region of glare content 108 at position p1 at time t1 and a second region of glare content 108 at position p2 at time t2. The second region of glare content 108 is not rendered at time t1 and the first region of glare content 108 is not rendered at time t2.

In some, but not necessarily all examples the glare system 104 may be configured to render a plurality of regions of glare content 108 p1, p2 concurrently.

In some, but not necessarily all examples the brightness of the glare content 108 may be controllable.

Although the examples described herein refer to the ability of the glare system 104 to render glare content 108 inside a field of view 202, it would be appreciated that the glare system 104 may or may not additionally be configured to render glare content 108 at positions wholly or predominantly outside the field of view 202.

FIGS. 3A, 3B, 3C, 3D, 3E illustrate example implementations of the apparatus 100 wherein the display 102 is a near eye display (NED). The apparatus 100 forms at least part of a head-mounted display (HMD) system 1000. An HMD system 1000 is worn on the head or as part of a helmet. A display 102 may be provided in front of one eye (monocular HMD) or each eye 110 (binocular HMD).

Figure 3A:
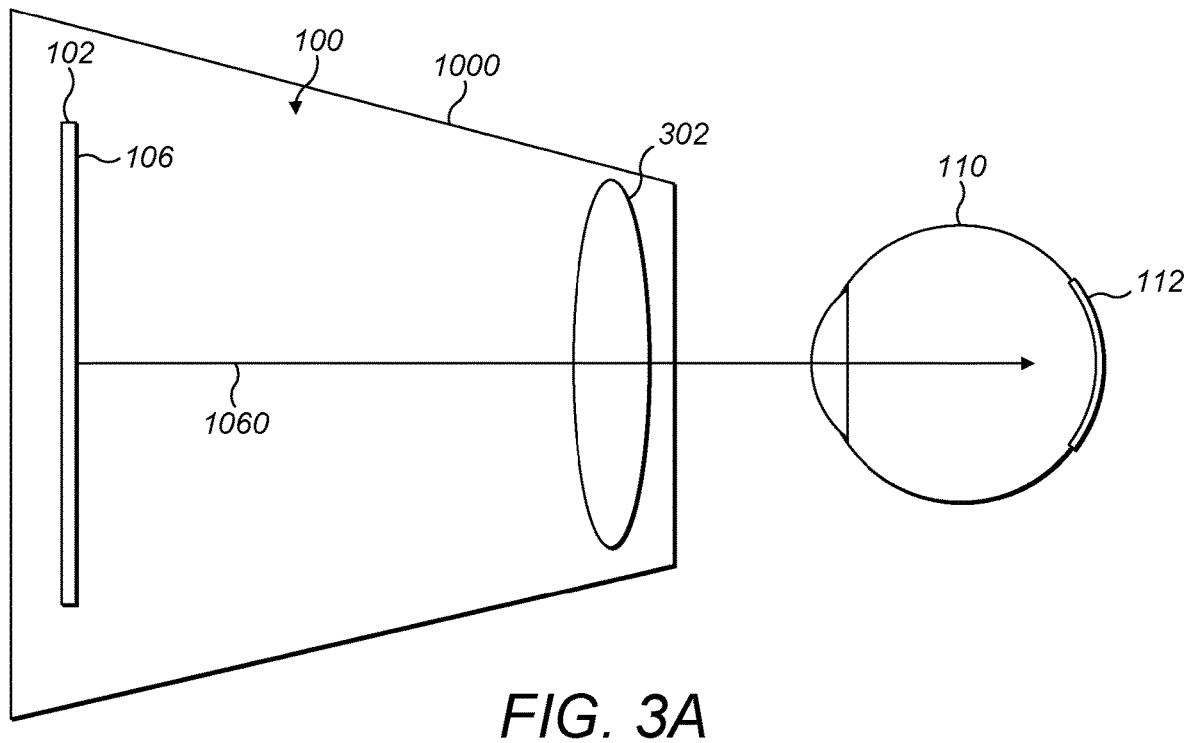
FIGS. 3A, 3B, 3C, 3D, 3E show examples of the subject matter described herein.

FIG. 3A illustrates an example configuration of an HMD system 1000 for one eye 110. The same configuration may be applied for the other eye in a binocular HMD system 1000.

The display 102 is small relative to non-NEDs. The HMD system 1000 comprises an optional eyepiece 302. The eyepiece 302 or a separate lens may magnify and/or re-focus the rendered display content 106 to enlarge and/or sharpen the effective DFOV and improve user immersion. In an example implementation, the eyepiece 302 is a Fresnel lens.

In some, but not necessarily all examples the HMD system 1000 may be configured for virtual reality. The display content 106 may be virtual reality content. The HMD system 1000 may be substantially opaque so that the user cannot see the real world through the display content 106.

In FIG. 3A, the display 102 is in front of the user's eye 110. However, examples of the present disclosure may be applied in other configurations in which the display 102 is away from the centre or even the periphery of a user's field of view, and an optical arrangement directs the display content 106 towards the centre of the user's field of view and to the user's eye 110.

Figure 3B:
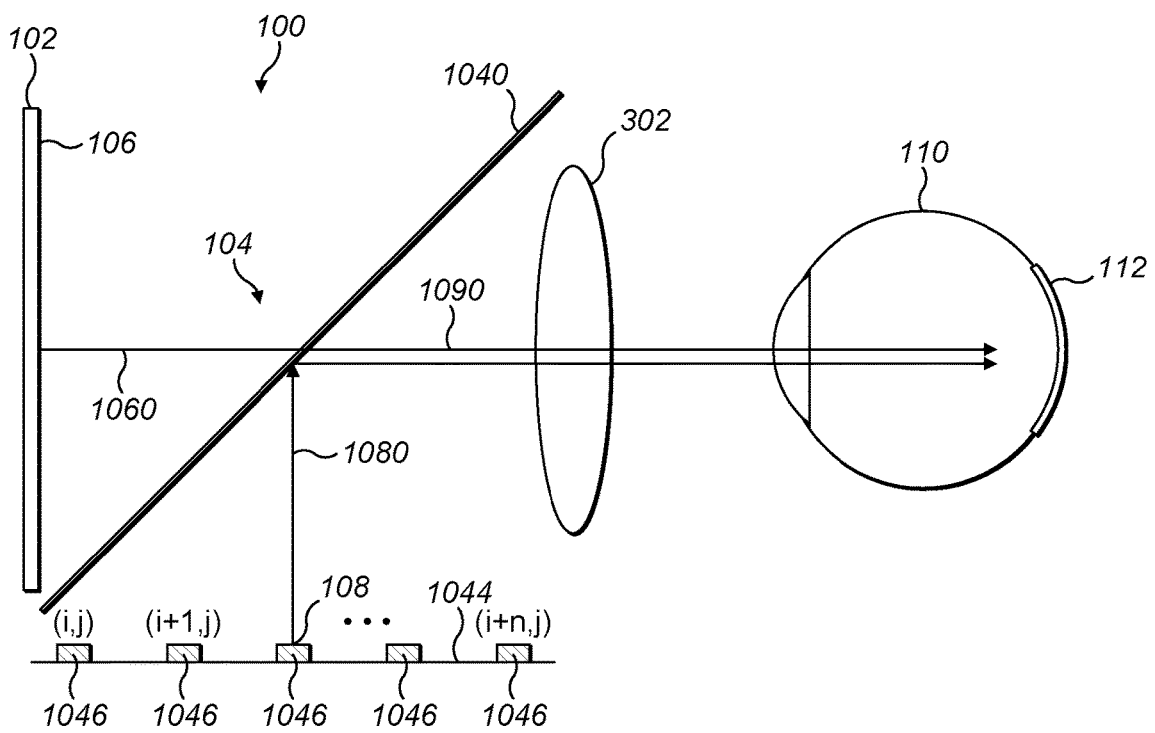

FIG. 3B shows an example implementation of the glare system 104 that does not require moving parts. In FIG. 3B, the glare system 104 is applied to the HMD of FIG. 3A, however, the glare system 104 may alternatively be applied to FIG. 1, FIG. 2, or other compatible examples. The apparatus 100 from FIG. 3B may provide a combined image 500 as shown in FIG. 5A.

The glare system 104 comprises a plurality of glare emitters 1046. The use of multiple spatially distributed glare emitters 1046 enables the position of glare content 108 to be controlled by controlling which glare emitters 1046 are illuminated, without a requirement for moving parts such as micro-electromechanical actuators.

The glare emitters 1046 comprise light emitting diodes or a suitable alternative. The glare emitters 1046 are collectively brighter than an effective backlight brightness of the display 102. Effective backlight brightness means once light from the backlight has passed through the liquid crystals/pixels of the display 102. The glare emitters 1046 are individually brighter than light emitting diodes of the display 102.

The illustrated glare emitters 1046 are configured to render pixelated glare content 108. The glare emitters 1046 may be arranged in a pixel matrix as shown. The matrix may form a regular array or an irregular pattern. The regular array may form orthogonal rows and columns. One row (or column) is illustrated, comprising glare emitters 1046 at positions (i, j), (i+1, j), . . . , (i+n, j), where i is a row and j is a column or vice versa. If an irregular pattern is used, the glare emitters 1046 may be positioned according to areas in the field of view 202 where it is anticipated that glare will be required. For example, the spatial density of glare emitters 1046 may be: greater in the periphery or in the centre of the field of view 202; greater in a left half or in a right half of the field of view 202; greater in a top half or a bottom half of the field of view 202; or a combination thereof.

The size of a region (area) of glare content 108, and the number of regions, are controllable by controlling how many glare emitters 1046 are illuminated. The brightness of glare content 108 may be controllable by controlling the brightness of a glare emitter 1046.

The spatial resolution of the glare emitters 1046 may be less than a spatial resolution of the display 102. For example, the display 102 may have an angular resolution (spatial resolution) of at least five pixels per degree more than the spatial resolution of the glare emitters 1046. The lower spatial resolution of the glare system 104 enables the selection of glare emitters 1046 with a greater peak luminance.

The glare emitters 1046 may be supported by a supporting structure 1044 such as a substrate.

The glare emitters 1046 may be substantially opaque. The glare emitters 1046 and any associated supporting structure 1044 may be peripherally offset from the DFOV, as shown.

Therefore, the glare system 104 comprises optics 1040 configured to superimpose the glare content 108 from the glare emitters 1046 onto the field of view 202 of the display content 106 to control the position of the glare content 108 in the combined (merged) image 500. The optics 1040 comprises any optical device that can change a direction of a beam of light, such as a beam combiner.

In FIG. 3B, the optics 1040 comprises a beam combiner configured to combine the display content 106 of the display 102 and the glare content 108 of the glare emitters 1046.

The beam combiner is configured to receive from the display 102 first pixelated light 1060 defining the display content 106. The first pixelated light 1060 may be incident in a first direction.

The beam combiner is configured to receive from the glare emitters 1046 second light 1080 defining the glare content 108. The second light 1080 may be pixelated light if the glare emitters 1046 are arranged as a matrix. The second light 1080 is incident in a second direction which is different from the first direction and depends on how the glare emitters 1046 are located and oriented relative to the display 102. In FIG. 3B, the first and second directions are substantially orthogonal.

The beam combiner is configured to combine the first pixelated light 1060 defining the display content 106 with the second light 1080 defining the glare content 108 to provide, as an output third pixelated light 1090 defining the combined image 500. Various beam combiners are commercially available. Some are formed by joining two prisms to form a cube. The beam combiner may e.g. consist of a partially reflecting surface or a dichroic mirror surface, which can e.g. be flat or have optical power.

In an alternative implementation not shown in FIG. 3B, the position of glare content 108 may be controlled via a mechanism (not shown) that slides or tilts the optics 1040 (active optics 1040), and/or that slides or tilts a glare emitter 1046 (active glare emitter 1046), and/or that slides or tilts an additional optical arrangement, such as a lens, installed between the optics 1040 and the glare emitters 1046.

In various examples, fewer glare emitters 1046 or only one glare emitter 1046 may be provided. An example of a single glare emitter 1046 is a high-brightness illuminator (backlight) for a second display (not shown). Pixels of the second display may selectively block the unpixelated light from the illuminator to control the position of glare content 108 transmitted through the second display towards the optics 1040. In an implementation, the second display is a monochrome display, when the glare content 108 is substantially white light. In an implementation, the second display is a liquid crystal display. In another example, the position of glare content 108 emitted by a single smaller glare emitter 1046 may be controlled by active optics 1040.

Figure 3C:
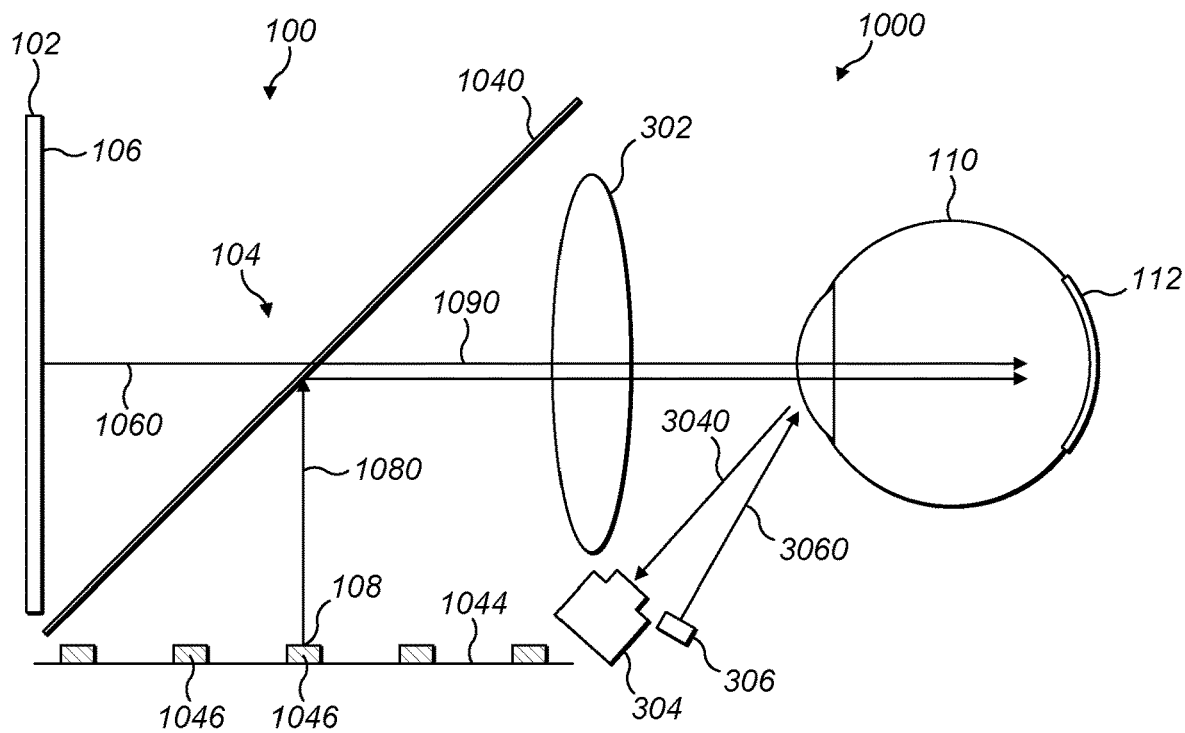

FIG. 3C illustrates the apparatus 100 of FIG. 3B comprising an eye sensor 304. The eye sensor 304 is configured to detect at least one ocular characteristic while the display content 106 and the glare content 108 are rendered. Alternatively, the eye sensor 304 could be applied to the apparatus 100 of FIG. 1, FIG. 2, or any other compatible example. An eye sensor 304 may be provided for one or each eye 110.

In some, but not necessarily all examples the eye sensor 304 is configured to detect at least one ocular characteristic indicative of gaze direction.

In some, but not necessarily all examples the eye sensor 304 is configured to detect at least one ocular characteristic indicative of pupil size.

In some, but not necessarily all examples the eye sensor 304 is configured to detect at least one ocular characteristic indicative of blinking.

Commercially available eye sensors include infra-red sensors and visible light cameras. An infra-red sensor may operate in the near infra-red spectrum, in some examples.

FIG. 3C illustrates an example implementation of the eye sensor 304. The apparatus 100 comprises an emitter 306 configured to emit electromagnetic radiation 3060 and an eye sensor 304 configured to detect reflected electromagnetic radiation 3040 reflected from the cornea.

One or more of the above ocular characteristics may be used for clinical vision testing or for simulation such as virtual reality simulation.

Clinical vision testing may comprise examining a user's response to glare. An improper pupil size, improper blinking, or a delayed response, may indicate a clinical condition. The combination of glare content 108 and display content 106 enables examination of the effect of glare on sight and cognition. The user may be asked questions about what they can see on the display 102 while they are subjected to controlled glare content 108. The precise positioning of glare content 108 enables precise determination of how much of the user's central and peripheral vision is affected by glare. The optional eye sensor 304 may help to support a diagnosis, or even enable automatic feedback control of the examination. An HMD system 1000 is useful for clinical vision testing because a wider field of view can be tested, because the apparatus 100 is in a fixed position relative to the eye 110 to aid repeatability, and because a user's vision can optionally be shielded from ambient light. For example, the HMD system 1000 may comprise a shroud (not shown) to block out ambient light.

The eye sensor 304 may be employed to improve immersion in a simulated activity such as playing a video game or operating a virtual reality simulator such as a flight simulator or driving simulator. For example, the user may be able to issue input commands by modifying their gaze direction and/or by blinking.

Figures 6A, 6B:
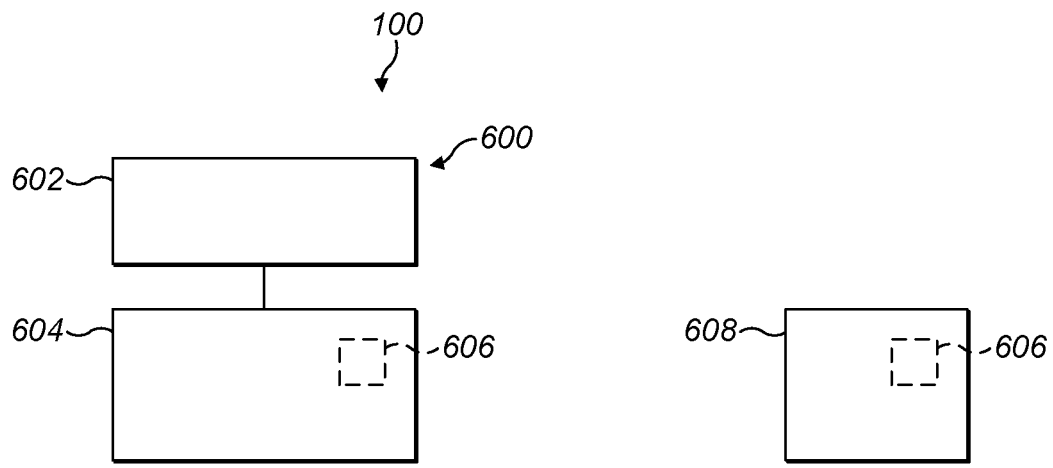
FIGS. 6A, 6B show examples of the subject matter described herein.

In some, but not necessarily all examples the apparatus 100 is configured to cause information from the eye sensor 304 to be stored in non-volatile memory, such as the memory shown in FIG. 6A. The information may be stored permanently until deleted or overwritten. This supports tracking of the user during clinical vision testing, or tracking of user performance during a simulated activity. Other information that may be stored includes, for example: glare content 108; display content 106; user data; microphone data; camera data; localization data, etc.

In some, but not necessarily all examples information from the eye sensor 304 is provided as feedback to control graphical rendering of the display content 106 and/or to control rendering of the glare content 108. For example, glare content 108 may be brightened or dimmed for user-specific optimization. The glare content 108 may be controlled to be bright enough to cause a desired user reaction, but not so bright that it triggers an extreme reaction.

Figure 3D:
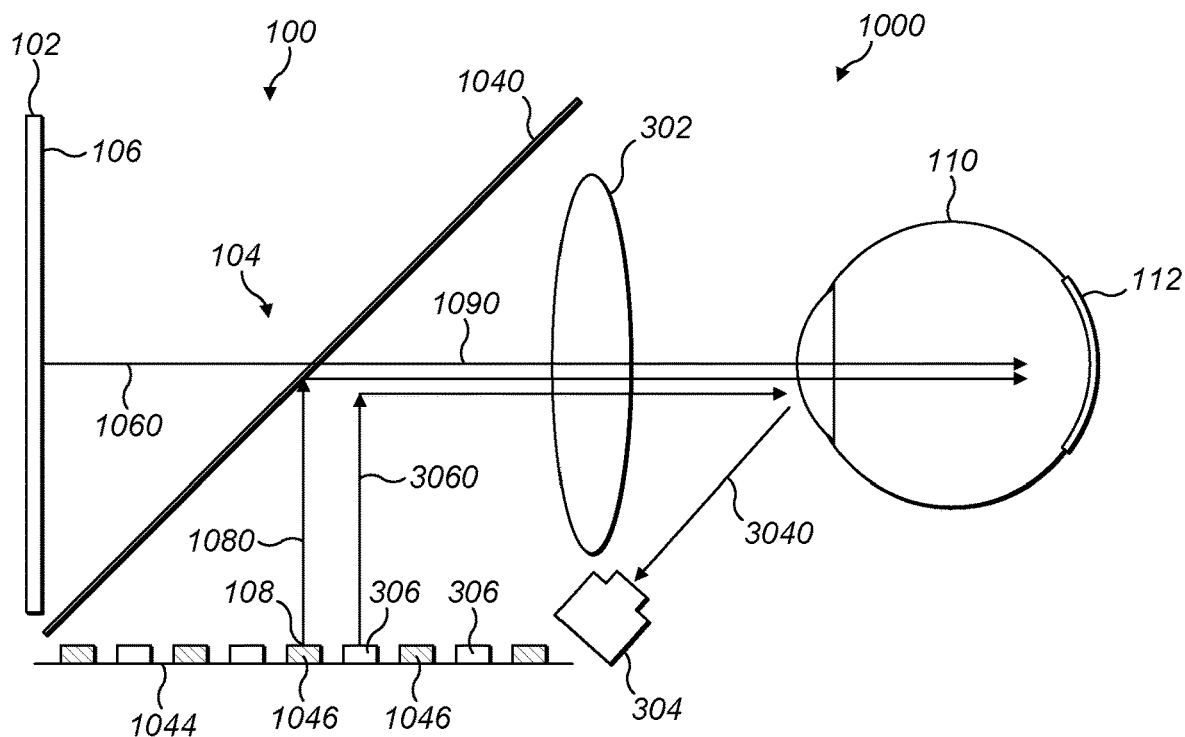
Figure 3E:
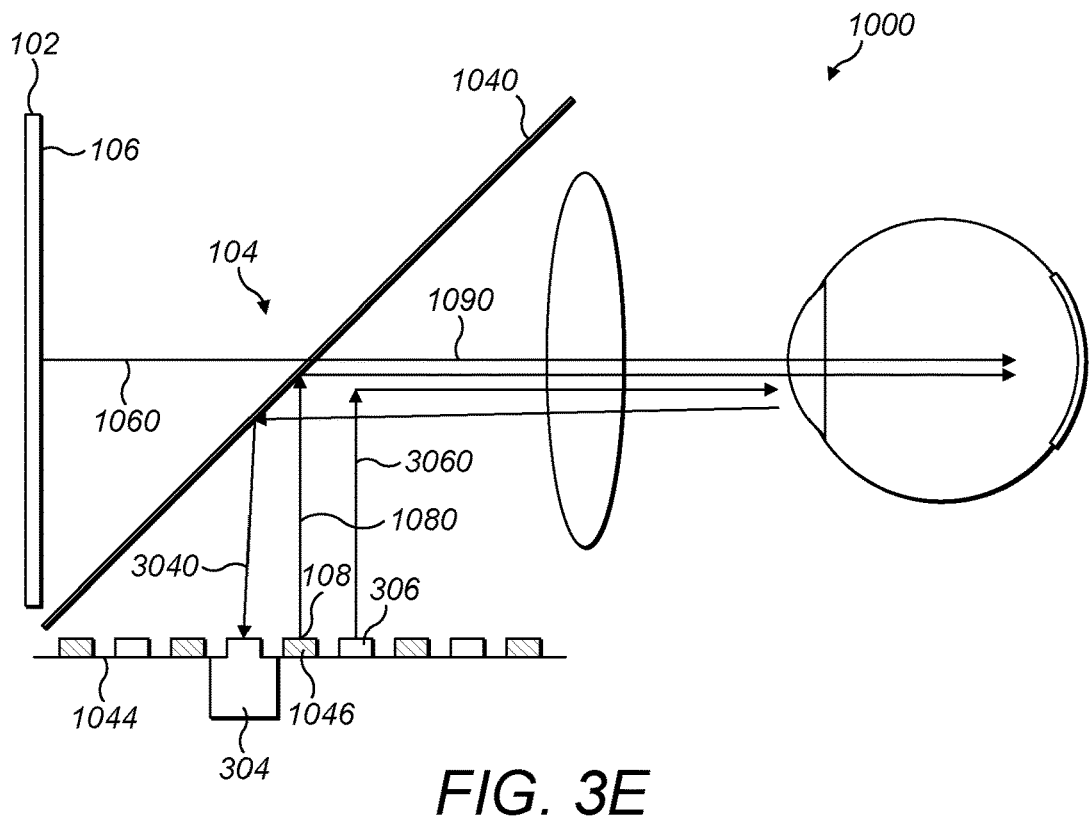

In FIG. 3C, the eye sensor 304 forms part of the HMD system 1000 and faces the eye 110. The eye sensor 304 may require its own optics. FIGS. 3D and 3E illustrate alternative arrangements that improve ease of packaging and may allow shared optics.

FIG. 3D and FIG. 3E show that the emitter 306 for the eye sensor 304 may be relocated, and may direct its electromagnetic radiation 3060 to the optics 1040 of the glare system 104. In FIGS. 3D and 3E, the optics 1040 comprises the beam combiner. The beam combiner directs the electromagnetic radiation 3060 to the cornea where it is reflected 3040 and detected by the eye sensor 304.

FIG. 3D and FIG. 3E show that the electromagnetic radiation 3060 from the emitter 306 for the eye sensor 304 may be incident to the optics 1040 in the second direction corresponding to the direction of the glare content 108.

FIGS. 3D and 3E show that an emitter 306 for the eye sensor 304 is located between individual glare emitters 1046. A plurality of emitters 306 for the eye sensor 304 may be provided. The glare emitters 1046 and the eye sensor emitters 306 may form an alternating pattern. The glare emitter(s) 1040 and an eye sensor emitter(s) 306 may be supported by a common supporting structure 1044.

In FIG. 3D, the eye sensor 304 is located in the original position shown in FIG. 3C. However, FIG. 3E shows that the eye sensor 304 may also be relocated. In FIG. 3E, the optics 1040 of the glare system 104 acts as a beam splitter to direct the electromagnetic radiation 3040 reflected from the user's cornea to the eye sensor 304.

FIG. 3E shows that the optics 1040 may direct the reflected electromagnetic radiation 3040 parallel to the second direction of the glare content 108, to the eye sensor 304. In FIG. 3E, the eye sensor 304 and the glare emitter(s) 1040 are supported by a common supporting structure 1044.

Figure 4A:
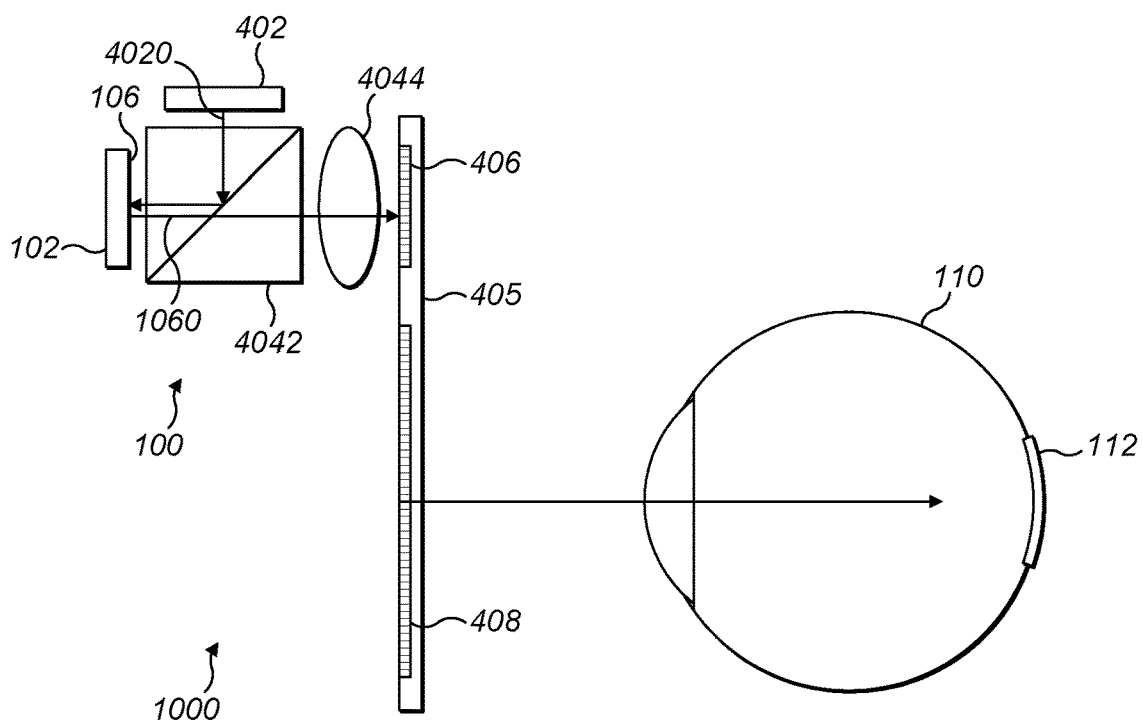
FIGS. 4A, 4B, 4C show examples of the subject matter described herein.
Figure 4B:
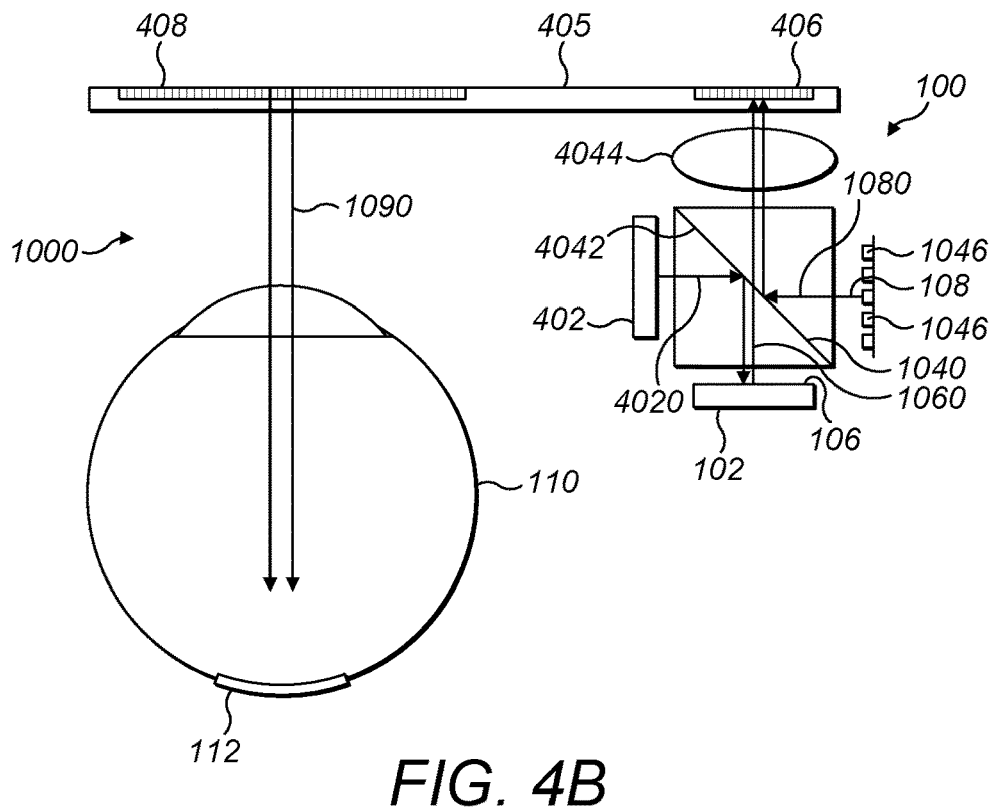
Figure 4C:
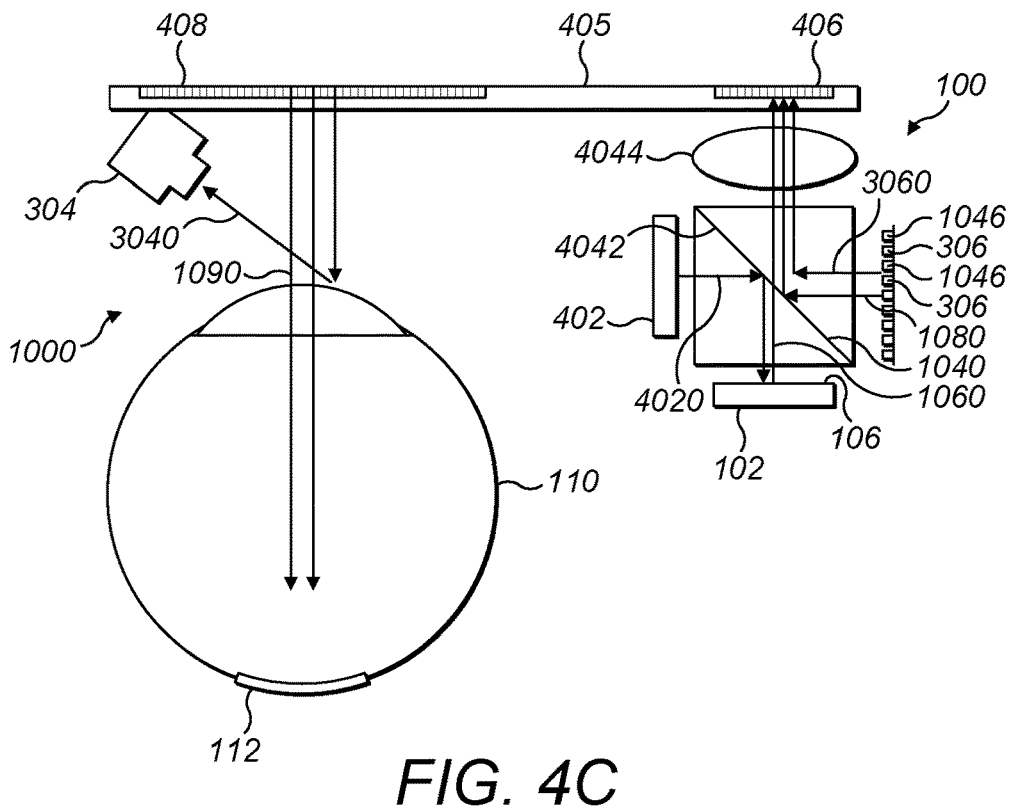

FIGS. 4A, 4B, 4C illustrate further example implementations of the apparatus 100 wherein the display 102 is a NED. The apparatus 100 forms at least part of an HMD system 1000. In contrast to FIGS. 3A-3E, the HMD system 1000 may be configured for augmented reality. The display content 106 may be augmented reality content, augmenting a user's view of the real world with virtual content. The HMD system 1000 may be substantially transparent so that the user can see the real world through the display content 106.

FIG. 4A shows an HMD system 1000 to which the glare system 104 may be applied. The display 102 is away from the centre or even the periphery of a user's field of view. An optical arrangement directs the display content 106 towards the centre of the user's field of view and to the user's eye 110. In some, but not necessarily all examples the HMD system 1000 is shaped like eyeglasses.

The HMD system 1000 may utilize curved combiner technology or waveguide technology, for example. Available waveguide technologies include: diffractive waveguides; holographic waveguides; reflective waveguides; or retinal projection.

FIG. 4A illustrates an HMD system 1000 that utilizes waveguide technology. FIG. 4A illustrates guiding optics 4042, 4044 directing the first pixelated light 1060 defining the display content 106 to an exit pupil expander 405. The exit pupil expander 405 is provided instead of the eyepiece 302 of FIG. 3A, to direct the third pixelated light defining the combined image 500 into a desired part of the user's field of view. The exit pupil expander 405 may be provided by a light guide comprising an in-coupling diffraction grating 406 and an out-coupling diffraction grating 408.

In some, but not necessarily all examples an illuminator 402 for the display 102 is provided separately from the display 102. A beam splitter 4042 of the guiding optics directs light 4020 from the illuminator 402 towards the display 102. The illuminator 402 may output unpixellated light 4020.

The display 102 selectively reflects the unpixellated light 4020 to produce the first pixelated light 1060 defining the display content 106. The peak luminance of the display 102 may be determined, at least in part, by the peak luminance of the illuminator 402.

In this example, the display 102 is provided by a liquid crystal on silicon device (LCOS). Such a device comprises a reflective layer and an array of liquid crystal (LC) pixel control elements. The array of LC pixel control elements are able to selectively control reflection of incident light pixel by pixel FIG. 4B illustrates the HMD system 1000 of FIG. 4A comprising a glare system 104. The beam splitter 4042 of the guiding optics acts as a beam combiner for the glare content 108, in analogy to the beam combiner of FIG. 3B. The glare emitter 1046 may be implemented using one of the techniques described in relation to FIGS. 3B-3E. The beam splitter/combiner 4042/1040 directs the first pixelated light 1060 defining the display content 106 and the second light 1080 defining the glare content 108 to the exit pupil expander 405.

FIG. 4C illustrates the HMD system 1000 of FIG. 4B comprising an eye sensor 304. The emitter 306 for the eye sensor 304 is positioned near the glare emitters 1046 in analogy with FIG. 3D. The eye sensor 304 is positioned with line of sight to the eye 110, and may for example be supported at the periphery of the exit pupil expander 405. In an alternative implementation, the emitter 306 for the eye sensor 304 may be located proximally to the eye sensor 304.

FIG. 5A illustrates a combined image 500 comprising virtual reality display content 106 and glare content 108. The combined image 500 is the retinal image 112 formed in the user's eye 110. The combined image 500 may be rendered by the apparatus 100 of FIGS. 1-2, or by the virtual reality HMD system 1000 of FIGS. 3A-3E.

The combined image 500 in the non-limiting example of FIG. 5A comprises two regions of glare content 108 concurrently rendered at two different positions across the field of view 202 of the display content 106. The glare content 108 obscures some information in the display content 106.

FIG. 5A illustrates that the size of a region of glare content 108 is capable of being controlled to be small, for example occupying an area less than 10% of an area of the field of view 202 of the display content 106. However, the regions of glare content 108 could be larger.

FIG. 5B illustrates a combined image 500 comprising augmented reality display content 106 and glare content 108, against a background of real objects that may be seen through a substantially transparent HMD system 1000, for example.

In this non-limiting example, the combined image 500 in FIG. 5B comprises two regions of glare content 108 concurrently rendered at two different positions across the field of view 202 of the display content 106. The glare content 108 obscures some information in the display content 106. For example, the glare content 108 makes recognition of the teapot in the display content 106 more challenging.

The apparatus 100 may comprise a controller configured to control the position and/or brightness of the glare content 108 rendered by the glare system 104 for the purposes described herein. FIG. 6A shows an example of a controller 600.

In some, but not necessarily all examples the controller 600 may be configured to control the position of the glare content 108 in dependence on control of the display content 106 rendered by the display 102. The display content 106 may be controlled by the controller 600 or by a different controller.

In some, but not necessarily all examples, the display content 106 depicts a virtual visual scene. This may occur in a simulation use case. A virtual visual scene refers to a representation of virtual visual space viewed from a virtual point of view (position and/or orientation) within a virtual visual space. The point of view may be a first-person perspective or a third-person perspective. A virtual visual space refers to a fully or partially artificial environment that may be viewed, which may be three dimensional.

In some, but not necessarily all examples the display content 106 depicts at least one virtual visual object. A virtual visual object may be an artificial virtual object (e.g. a computer-generated virtual object) or it may be an image of a real object in a real space that is live or recorded. A virtual object may be within a virtual visual scene (e.g. virtual reality) or displayed alone (e.g. augmented reality).

Some virtual objects may emit virtual light, for example a virtual sun or a virtual lamp, while other virtual objects merely reflect virtual light, for example the ground. The controller 600 may be configured to control the position of the glare content 108 to maintain a region of glare content 108 at the location of the virtual light-emitting virtual object within the virtual visual scene. This improves immersion because the brightness of bright virtual light-emitting virtual objects such as the sun can be better-replicated. In some examples, a light-reflecting virtual object can also be bright, such as a mirror reflecting the sun, in which case glare content 108 might be rendered at the location of a bright virtual light-reflecting virtual object.

In some, but not necessarily all examples a location at which glare content 108 is to be rendered is selected in dependence on an indication of the brightness of the virtual light associated with that location, for example associated with a virtual object at the location. In some implementations, a location could be selected if its associated indicated brightness is above a threshold.

The apparatus 100 may be provided with a human-machine interface or gesture/body motion sensor for enabling control of the point of view and/or for enabling manipulation of virtual objects. The control is enabled with a certain number of degrees of freedom, such as 3D position and/or 3D orientation. The position(s) of glare content 108 may be dynamically moved across the field of view 202 of the display content 106 to move within the combined image 500, in dependence on dynamic control of the display content 106. For example, the glare content 108 may be dynamically moved in dependence on the control of the point of view and/or manipulation of the virtual object, to maintain correspondence of the glare content 108 to bright virtual objects.

The above example improves immersion in simulation activities for leisure or for training and assessment, or even clinical vision tests that rely on similar display content 106.

In other examples, the control of the position of the glare content 108 may not depend on the display content 106. The controller 600 may be configured to control the position (and optionally brightness) of the glare content 108 based on a predetermined or random pattern or a predetermined set of rules. This may be useful in specific clinical vision testing or other experiments that require repeatability whether or not the display content 106 changes. A predetermined pattern is nonrandom but is not affected by the display content 106 being displayed. An example rules-based approach relies on feedback from the eye sensor 304, to perform the above-mentioned user-specific optimization of glare content 108.

A few examples of clinical vision tests with which the apparatus 100 may be used include: stereo vision tests; visual acuity tests; colour recognition tests; visual field tests; contrast sensitivity tests; or halogen glare sensitivity tests. Various clinical conditions and human characteristics can affect glare sensitivity, such as: age; fatigue; eye diseases; eye degeneration; diabetes; migraines; drug side-effects; brain damage; and intoxication.

A few examples of simulation activities with which the apparatus 100 may be used include training, accreditation, or video game simulations. The activity represented by the display content 106 may comprise controlling a machine such as driving a car or piloting an aircraft, and/or controlling a virtual person in first-person perspective or in third-person perspective. One example simulation use case other than controlling a machine is simulating a structured environment such as a workplace or other architectural space, to test user acceptability of glare levels from natural and/or artificial light. The glare levels could be increased or decreased depending on how glare-sensitive the individual users are.

The apparatus 100 may also be used in other contexts such as improving immersion when watching television or movies.

FIG. 6A illustrates an example of a controller 600. Implementation of a controller 600 may be as controller circuitry. The controller 600 may be implemented in hardware alone, have certain aspects in software including firmware alone or can be a combination of hardware and software (including firmware).

As illustrated in FIG. 6A the controller 600 may be implemented using instructions that enable hardware functionality, for example, by using executable instructions of a computer program 606 in a general-purpose or special-purpose processor 602 that may be stored on a computer readable storage medium (disk, memory etc) to be executed by such a processor 602.

The processor 602 is configured to read from and write to the memory 604. The processor 602 may also comprise an output interface via which data and/or commands are output by the processor 602 and an input interface via which data and/or commands are input to the processor 602.

The memory 604 stores a computer program 606 comprising computer program instructions (computer program code) that controls the operation of the apparatus 100 when loaded into the processor 602. The computer program instructions, of the computer program 606, provide the logic and routines that enables the apparatus to perform the methods illustrated in FIG. 7. The processor 602 by reading the memory 604 is able to load and execute the computer program 606.

Figure 7:
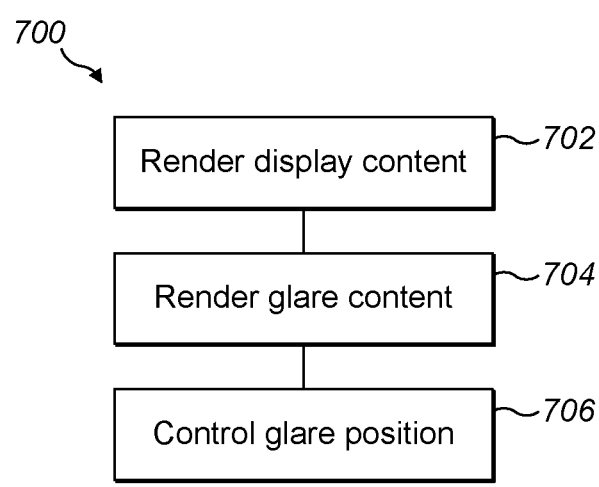
FIG. 7 shows another example of the subject matter described herein.

The apparatus 100 therefore comprises:
at least one processor 602; and
at least one memory 604 including computer program code
the at least one memory 604 and the computer program code configured to, with the at least one processor 602, cause the apparatus 100 at least to perform a method 700 as shown in FIG. 7, comprising:
  at block 702, causing a display 102 to render display content 106 over a field of view 202;
  at block 704, causing a glare system 104 to render glare content 108 in the field of view 202; and
  at block 706, controlling the glare system 104 to render the glare content 108 at different positions across the field of view 202 at different times while the display 102 renders the display content 106. Optional additional control functions of the apparatus 100 are described earlier in this specification and may form part of the method 700.

As illustrated in FIG. 6B, the computer program 606 may arrive at the apparatus 100 via any suitable delivery mechanism 608. The delivery mechanism 608 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 606. The delivery mechanism may be a signal configured to reliably transfer the computer program 606. The apparatus 100 may propagate or transmit the computer program 606 as a computer data signal.

Computer program instructions for causing an apparatus 100 to perform at least the following or for performing at least the following:
  causing a display 102 to render display content 106 over a field of view 202;
  causing a glare system 104 to render glare content 108 in the field of view 202; and
  causing control of the glare system 104 to render the glare content 108 at different positions across the field of view 202 at different times while the display 102 renders the display content 106.

The computer program instructions may be comprised in a computer program, a non-transitory computer readable medium, a computer program product, a machine readable medium. In some but not necessarily all examples, the computer program instructions may be distributed over more than one computer program.

Although the memory 604 is illustrated as a single component/circuitry it may be implemented as one or more separate components/circuitry some or all of which may be integrated/removable and/or may provide permanent/semi-permanent/dynamic/cached storage.

Although the processor 602 is illustrated as a single component/circuitry it may be implemented as one or more separate components/circuitry some or all of which may be integrated/removable. The processor 602 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus 100, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 7 may represent steps in a method and/or sections of code in the computer program 606. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory storing instructions, that when executed by the at least one processor, cause the apparatus at least to:
   render display content over a field of view;
   render, with a glare system comprising a plurality of glare emitters, glare content in the display content over the field of view, wherein the glare system is configured to render, with the glare system, the glare content at different positions across the field of view at different times while a display renders the display content, and wherein the rendering of the display content causes the glare content to obscure some information in the display content; and control, using a multiple spatially distributed glare emitter, a position of the glare content rendered by the glare system by controlling which of the plurality of glare emitters are illuminated.

2. The apparatus of claim 1, wherein the at least one memory is storing instructions, that when executed by the at least one processor, cause the apparatus at least to:
render the display content at up to a first peak luminance, and wherein the glare system is configured to render the glare content at up to a second peak luminance greater than the first peak luminance.

3. The apparatus of claim 1, wherein the glare system comprises optics configured to superimpose the glare content from the plurality of glare emitters onto the field of view.

4. The apparatus of claim 3, wherein the optics comprises a beam combiner configured to combine the display content of the display and the glare content of the plurality of glare emitters.

5. The apparatus of claim 1, wherein the at least one memory is storing instructions, that when executed by the at least one processor, cause the apparatus at least to render, with the glare system, the glare content at different positions across the field of view concurrently, while the display renders the display content.

6. The apparatus of claim 1, wherein the at least one memory is storing instructions, that when executed by the at least one processor, cause the apparatus at least to control, with a controller, the position of the glare content rendered by the glare system.

7. The apparatus of claim 6, wherein the at least one memory is storing instructions, that when executed by the at least one processor, cause the apparatus at least to control the position of the glare content in dependence on control of the display content rendered by the display.

8. The apparatus of claim 6, wherein the at least one memory is storing instructions, that when executed by the at least one processor, cause the apparatus at least to control the position of the glare content based on a predetermined pattern or random pattern.

9. The apparatus of claim 6, wherein the at least one memory is storing instructions, that when executed by the at least one processor, cause the apparatus at least to dynamically move the position of the glare content across the field of view while the display renders the display content.

10. The apparatus of claim 1, comprising an eye sensor configured to detect at least one ocular characteristic while the display content and the glare content are rendered.

11. The apparatus of claim 10, configured to cause information from the eye sensor to be stored in non-volatile memory.

12. The apparatus of claim 1, wherein the display is a near-eye display.

13. A head-mounted display system comprising the near-eye display and the glare system of the apparatus of claim 12 for one or each eye of a user.

14. A method comprising:
rendering display content over a field of view;
rendering, with a glare system comprising a plurality of glare emitters, glare content in the field of view;
controlling the glare system to render the glare content at different positions across the field of view at different times while rendering the display content, wherein the rendering of the display content causes the glare content to obscure some information in the display content; and
controlling, using a multiple spatially distributed glare emitter, a position of the glare content rendered by the glare system by controlling which of the plurality of glare emitters are illuminated.

15. The method of claim 14, wherein the display is configured to render the display content at up to a first peak luminance, and wherein the glare system is configured to render the glare content at up to a second peak luminance greater than the first peak luminance.

16. The method of claim 14, further comprising controlling the glare system to render the glare content at different positions across the field of view concurrently, while the display renders the display content.

17. The method of claim 16, further comprising controlling the glare system to render the glare content at a position in dependence on control of the display content rendered by the display.

18. The method of claim 16, further comprising controlling the glare system to dynamically move the position of the glare content across the field of view while the display renders the display content.

19. The method of claim 14, further comprising detecting, using an eye sensor, at least one ocular characteristic while the display content and the glare content are rendered.

20. A non-transitory computer readable medium comprising: a computer program comprising instructions for causing an apparatus to perform at least the following:
causing a display to render display content over a field of view;
causing a glare system comprising a plurality of glare emitters to render glare content in the field of view; and
causing control of the glare system to render the glare content at different positions across the field of view at different times while the display renders the display content, wherein the rendering of the display content causes the glare content to obscure some information in the display content; and
causing a multiple spatially distributed glare emitter to control a position of the glare content rendered by the glare system by controlling which of the plurality of glare emitters are illuminated.

* * * * *